(12) United States Patent
Schaye

(10) Patent No.: US 12,054,095 B2
(45) Date of Patent: Aug. 6, 2024

(54) VEHICLE FRONT ALERT SYSTEM

(71) Applicant: Pedestrian Safety Solutions, LLC, New York, NY (US)

(72) Inventor: Paul I. Schaye, New York, NY (US)

(73) Assignee: Pedestrian Safety Solutions, LLC, New York, NY (US)

(*) Notice: Subject to any disclaimer, the term of this patent is extended or adjusted under 35 U.S.C. 154(b) by 237 days.

(21) Appl. No.: 17/889,335

(22) Filed: Aug. 16, 2022

(65) Prior Publication Data

US 2023/0249615 A1    Aug. 10, 2023

Related U.S. Application Data

(63) Continuation-in-part of application No. 17/850,986, filed on Jun. 27, 2022, now Pat. No. 11,712,994, which is a continuation-in-part of application No. 17/574,477, filed on Jan. 12, 2022.

(51) Int. Cl.
| | |
|---|---|
| *B60Q 1/54* | (2006.01) |
| *B60Q 1/28* | (2006.01) |
| *B60Q 1/56* | (2006.01) |
| *B60Q 1/26* | (2006.01) |

(52) U.S. Cl.
CPC ............... *B60Q 1/54* (2013.01); *B60Q 1/28* (2013.01); *B60Q 1/56* (2013.01); *B60Q 1/2696* (2013.01)

(58) Field of Classification Search
CPC ... B60Q 1/54; B60Q 1/28; B60Q 1/56; B60Q 1/2696; B60Q 2400/30; B60Q 2900/40; B60Q 1/0035; B60Q 1/2661; B60Q 1/442; B60Q 1/444

USPC .......................................................... 340/467
See application file for complete search history.

(56) References Cited

U.S. PATENT DOCUMENTS

| | | |
|---|---|---|
| 5,798,691 A | 8/1998 | Kao |
| 7,397,355 B2 | 7/2008 | Tracy |
| 7,525,254 B2 | 4/2009 | Lys |
| 10,981,496 B2 | 4/2021 | Schaye |
| 2005/0063194 A1 | 3/2005 | Lys |
| 2006/0125615 A1 | 6/2006 | Song |
| 2006/0125616 A1 | 6/2006 | Song |
| 2006/0250229 A1 | 11/2006 | Cheng |
| 2007/0008096 A1 | 1/2007 | Tracy |
| 2008/0309478 A1 | 12/2008 | Morales |

(Continued)

OTHER PUBLICATIONS

Pedestrian Safety Solutions, PCT application No. PCT/US2022/017125, filed Feb. 20, 2022, Search Report Dated Jun. 9, 2022.

(Continued)

*Primary Examiner* — Eric Blount
(74) *Attorney, Agent, or Firm* — Dinsmore & Shohl LLP

(57) ABSTRACT

A lighting system enables a lighting pattern to be displayed on a vehicle when the vehicle is in motion. A lighting pattern may include lights that fluctuate (with respect to luminosity) or lights that stay, that is, are solid, at the same luminosity. The length of time that a light, such as an LED lamp, is powered on may vary. Similarly, the amount of time between two adjacent lights are powered off and powered on may also vary. As such, the lighting sequence is flexible and can be customized so that all lights are not on for the same length of time and the time between two lights being powered may vary. A vehicle front alert system allows for improved perception of speed of an approaching vehicle, human, or object.

1 Claim, 13 Drawing Sheets

(56) References Cited

U.S. PATENT DOCUMENTS

| | | |
|---|---|---|
| 2014/0049973 A1 | 2/2014 | Adachi |
| 2015/0258928 A1 | 9/2015 | Goto |
| 2016/0023588 A1 | 1/2016 | Peterson |
| 2017/0223248 A1 | 8/2017 | Oshima |
| 2018/0037158 A1 | 2/2018 | Schaye |
| 2019/0111833 A1 | 4/2019 | Nielsen |
| 2019/0143888 A1 | 5/2019 | Schaye |
| 2019/0315271 A1 | 10/2019 | Tatara et al. |
| 2020/0307446 A1 | 10/2020 | Hence |
| 2020/0353862 A1 | 11/2020 | Schaye |
| 2020/0361370 A1 | 11/2020 | Wescott |

OTHER PUBLICATIONS

Pedestrian Safety Solutions, PCT application No. PCT/US2022/017125, filed Feb. 20, 2022, Written Opinion Dated Jun. 9, 2022.

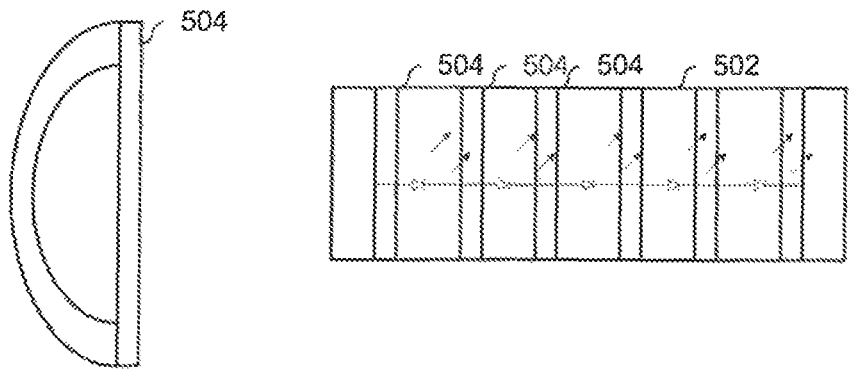
FIG. 6
 (Amber – indicates driver is braking)
 (White – indicates driver is not braking)
FIG. 7

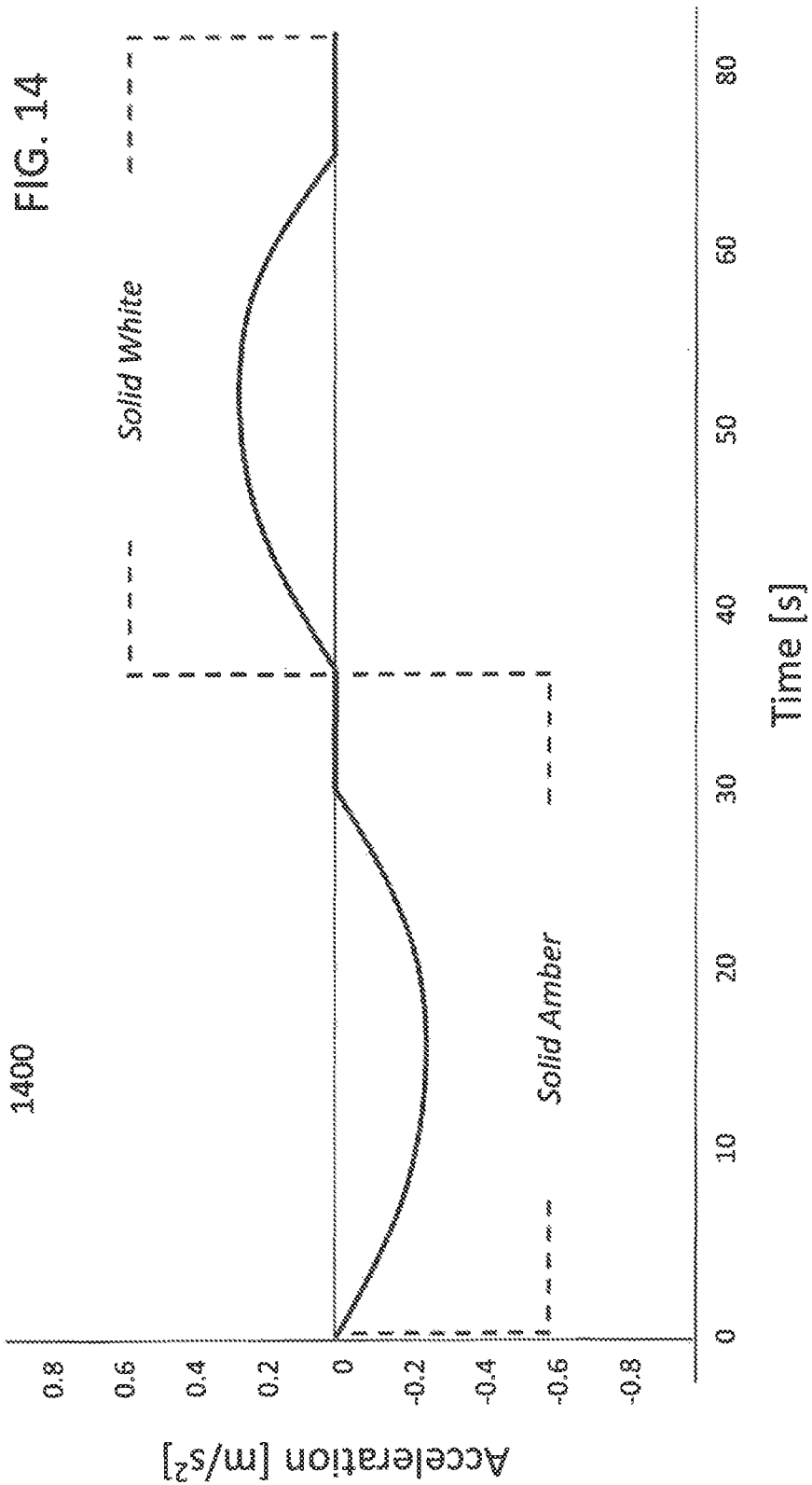

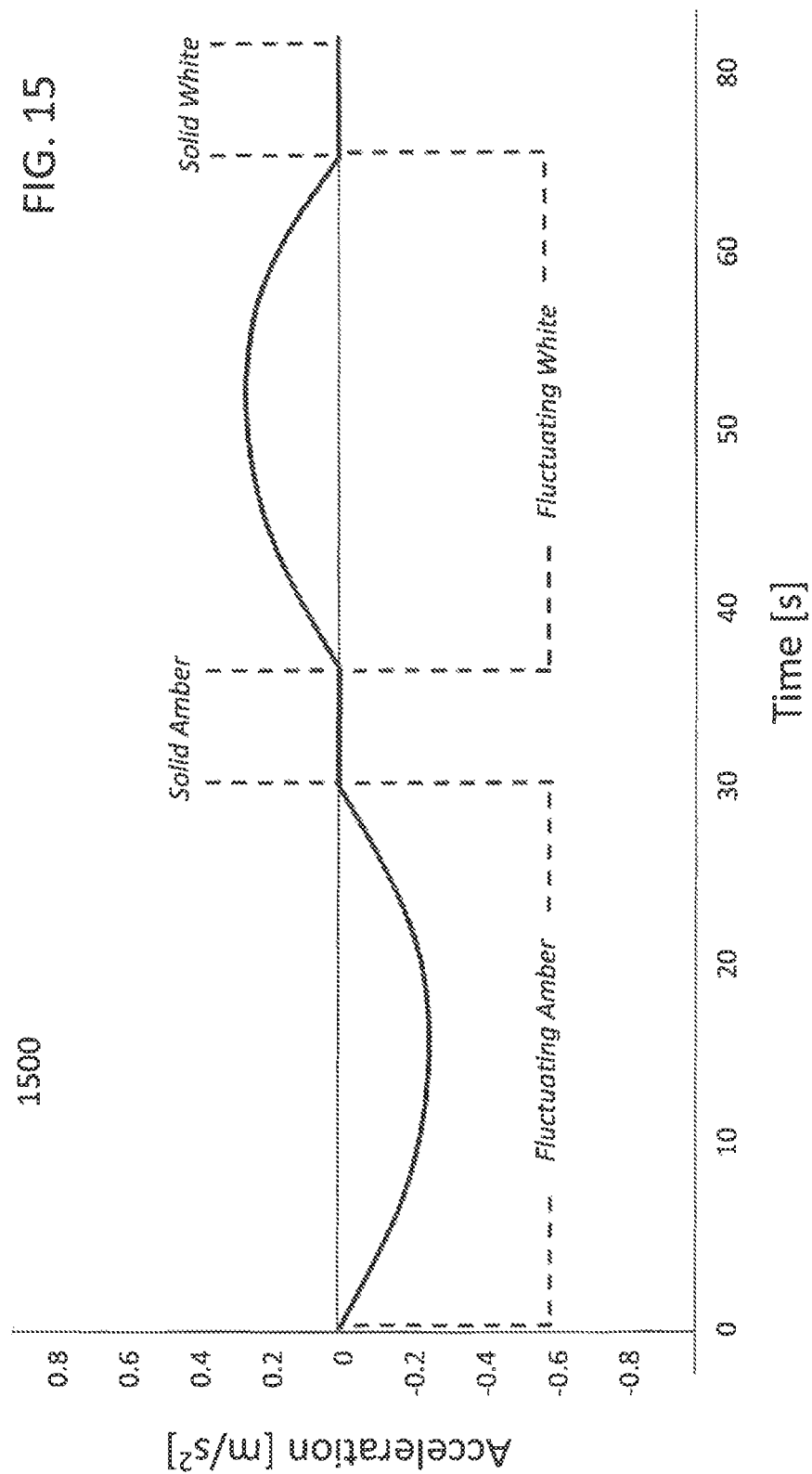

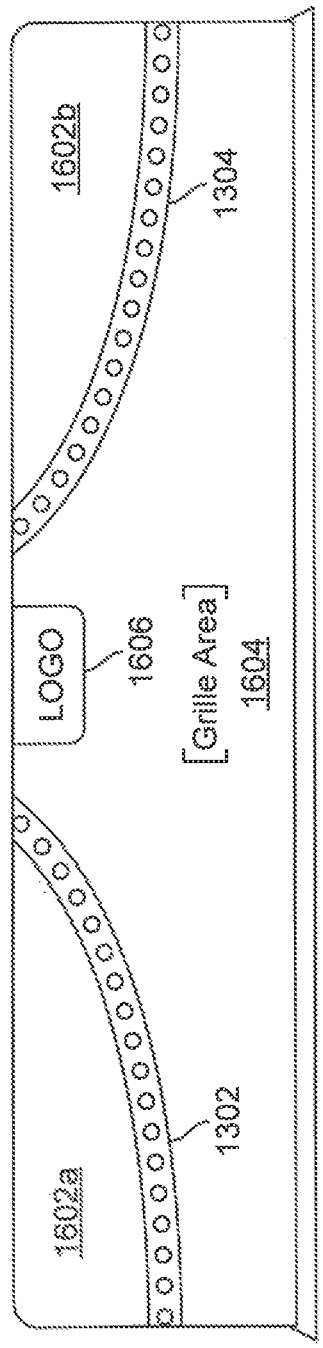
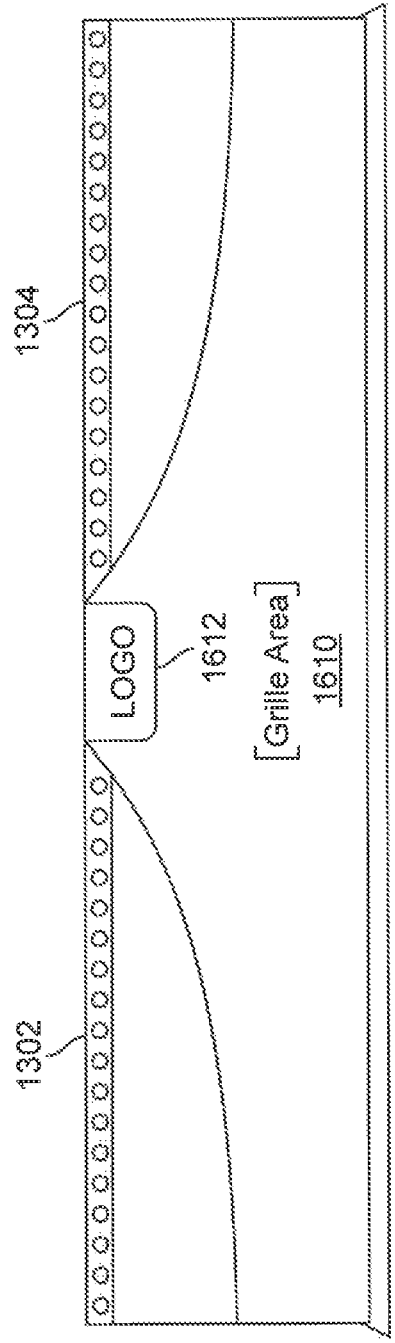

US 12,054,095 B2

VEHICLE FRONT ALERT SYSTEM

CROSS-REFERENCE TO RELATED APPLICATIONS

This application is a continuation-in-part of U.S. patent application Ser. No. 17/850,986, filed Jun. 27, 2022, entitled "VEHICLE FRONT ALERT SYSTEM", which further claims priority to U.S. patent application Ser. No. 17/574,477, filed Jan. 12, 2022, entitled "Vehicle Front Alert System," the content of which is incorporated by reference herein in its entirety.

FIELD OF THE INVENTION

The present disclosure generally relates to vehicle safety components such as an alert system for alerting persons and vehicles in front of a vehicle as to a state of the vehicle. The disclosure relates more particularly to apparatus and techniques for performing such signaling using a light system contained in or around a vehicle headlamp compartment or in a vehicle grille area.

BACKGROUND

Presently, distracted driving has become an increasingly important issue for vehicle and road safety. The clearest example of this arises from drivers using mobile devices while driving preventing them from paying attention to other vehicles and pedestrians. Other sources of distractions include interacting with a car's entertainment system, also becoming increasingly complex. Improvements in vehicle and micromobility safety are desirable.

SUMMARY

In one aspect, a deceleration indication apparatus for a vehicle includes a license plate frame and a printed circuit board containing an accelerometer, multiple light-emitting diodes (LEDs), and circuitry. It also has an electrical connection to a power source, wherein deceleration of the vehicle causes the accelerometer to send a signal through the circuitry to illuminate the thereby providing a visual indication that the vehicle is decelerating and possibly coming to a stop.

In another aspect, a front brake light apparatus for a vehicle includes a license plate frame, a printed circuit board containing multiple LEDs and circuitry. An electrical connection to a rear brake light component of the vehicle provides power to the apparatus. It also provides an actuation signal to the printed circuit board to illuminate the LEDs and to supply power to the apparatus when the rear brake light component is activated.

Another aspect is a method of illuminating LEDs on a license plate frame of a vehicle. An accelerometer or other sensor on the vehicle detects deceleration of the vehicle. A signal is sent from the accelerometer or other sensor to the circuitry in the frame. This actuates or illuminates the LEDs upon deceleration.

For a vehicle, a front-facing indicator—such as a lamp mounted on or near a license plate frame—indicates whether the driver is currently braking or not to signal to pedestrians and others in front of the vehicle as to the state of the vehicle and/or the driver. The indicator can be on (braking) or off (not braking) or can be on with a first color (braking) or on with a second color (not braking). The control for the indicator might be tied mechanically to a brake cable or actuator, tied electrically to a rear brake light circuit, and/or logically controlled by a vehicle computer. If tied logically to the vehicle computer, the logic for selecting a particular state might be driven by autonomous automobile logic.

In another aspect of the invention, the illuminating LEDs or other lights are contained in a headlamp compartment or in a grille area of a vehicle.

In another aspect of the invention, the LEDs or other lights in the VFAS lighting apparatus remain solid during acceleration and deceleration periods between 0 mph and a threshold speed.

The following detailed description together with the accompanying drawings will provide a better understanding of the nature and advantages of the present invention.

BRIEF DESCRIPTION OF THE DRAWINGS

Various embodiments in accordance with the present disclosure with reference to the drawings, in which:

FIG. 6 illustrates a protector bar and placement of several protector bars over an LED array;

FIG. 7 illustrates different light colors and their meanings;

FIG. 14 shows a graph demonstrating lighting sequence and acceleration in meters per second squared on the y-axis and time in seconds on the x-axis in accordance with one embodiment;

FIG. 15 shows a graph demonstrating a lighting sequence and acceleration in meters per second squared on the y-axis and time in seconds on the x-axis in accordance with a second embodiment;

FIG. 16A is an illustrative diagram of the front of a vehicle in accordance with one embodiment;

FIG. 16B is another illustration of the front of a vehicle in accordance with one embodiment.

DETAILED DESCRIPTION

Figure 1:
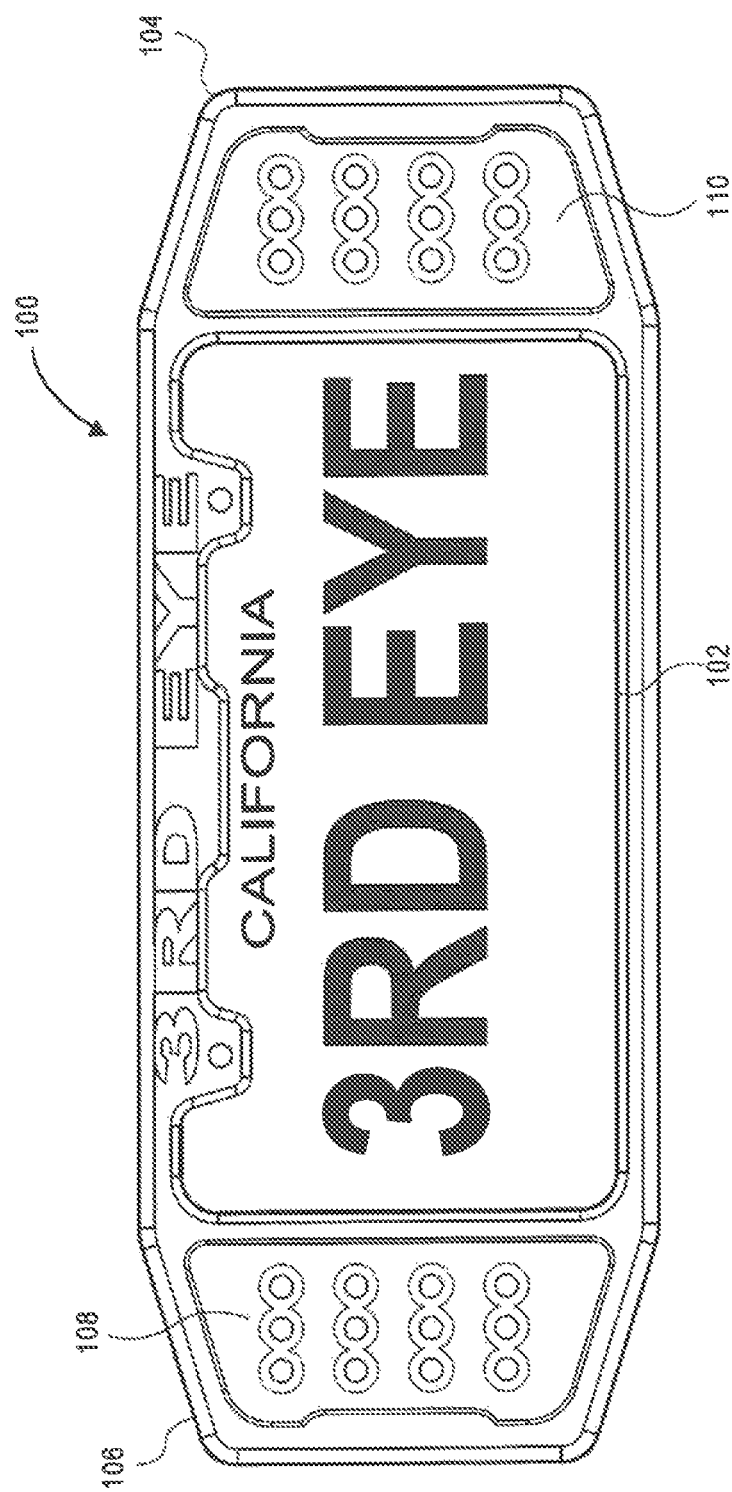
FIG. 1 is a frontal view of a license plate frame containing a license plate and showing the location of LEDs in accordance with one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In embodiments described herein, a vehicle includes various safety components such as an alert system for alerting persons and vehicles in front of a vehicle as to a state of the vehicle. The state might be the braking state of the vehicle. Example braking states might be (1) a state wherein the driver is not braking, (2) a state wherein the driver is partially braking, and (3) a state wherein the vehicle is stopped. The alert system might also indicate whether the vehicle detects a pedestrian. This signaling can provide for improved automotive and pedestrian safety. Conventional brake lights mounted on the rear of a vehicle indicate to those behind the vehicle that brakes are being applied—signaling that the vehicle is expected to be slowing down. However, the information conveyed is not available to persons in front of the vehicle, unless the person is able to note the reflection of the rear brake lights or able to see a rear window mounted brake light. The alert system might include a license place mounted light or light strip.

The state of the vehicle might be indicated by an on/off state, such as off indicating that the vehicle is not braking and on indicating that the vehicle is braking. In another embodiment, the light is illuminated with one color for braking and another color for not braking. This permits the vehicle to indicate regardless of state that the system is operating. In one example, a neutral color, such as a white light, might indicate that the system is operating and an amber light might indicate that the vehicle is braking. In some variations, the indicator might be solid and in others it might be oscillating, as described in greater detail below.

In this manner, a light mounted on the front of a vehicle, such as on a license plate frame, visually signals deceleration or lack of deceleration to inform a pedestrian or others who are in front of the vehicle. In addition to braking state, the indicator might also indicate, by color variation, oscillating or flashing pattern, etc. that the vehicle has sensed the pedestrian. These are collectively referred to herein as one or more visual signals or indications. Where such indicators become common, a typical pedestrian would then be able to discern the state of an approaching vehicle to determine if the driver or the autonomous driving logic has applied the brakes. The indicators may also indicate whether the vehicle has sensed the pedestrian, whether the vehicle has come to a complete stop, etc., to allow the pedestrian to make decisions about movement, evasive action, alarm, etc.

Other vehicles and pedestrians would like to know whether an approaching vehicle is slowing down or coming to a stop and be able to tell that it is doing so from looking only at the front of the car. Rear brake lights have long served this function but from the back of the car and is primarily for the benefit of the vehicle behind it, to let that car know that the car in front is slowing down.

The type of visual signal provided by examples herein—that a vehicle is slowing down or has other state—is beneficial for cars and people in front of a moving car. For example, it would be useful to a person crossing a road at a crosswalk to be able to tell more clearly that an approaching car is slowing down or braking so the person is assured that it is safe to cross. In another example, a driver sees in her rear-view mirror that a car is approaching from behind her. It would be beneficial to this driver to see a signal that the car behind her is slowing down, a signal that is of course not available from the approaching car's rear brake light. Furthermore, the need for a visual signal is especially acute with the advent of autonomous and semi-autonomous driving technology. Pedestrians and other drivers (and other self-driving vehicles) need assurance that a vehicle is slowing down.

In one described embodiment, an apparatus for implementing a license plate frame that provides a visual indication, such as illumination by way of an incandescent, fluorescent, or light emitting diode (LED) lamp or array of lamps, of a moving vehicle that is braking, decelerating, or coming to a stop is described in the various figures. There are numerous embodiments, some of which utilize a car brake mechanism or system, or only the rear brake light component, or both. In other embodiments, the visual indication system may utilize accelerometers or other sensory technologies to determine deceleration, instead of or in addition to being coupled to a brake component of the car. In yet other embodiments, the visual indication system is not in the form of a license plate frame, but is rather in the form of a light component or other component in the front or on the side of the car.

The described embodiment is a license plate frame with LEDs on both sides of the frame, as shown in the figures. The power source for the LEDs and circuitry contained in the frame is supplied by the car, typically the battery. The deceleration input may be provided by, for example, the car's rear brake light sub-components, accelerometers, or other sensors. An illustration of a license plate frame apparatus is shown in FIG. 1.

In one embodiment, the license plate frame is attached to the front of a vehicle and secures a license plate. Other locations or placement of the LEDs in the front of the vehicle are possible, as described below. In other embodiments, different types of visual indications or illumination sources can be used, such as organic light emitting diodes (OLEDs), halogen lights, and the like. On the sides of the license plate frame are layers or configurations of lenses, reflectors, LEDs, and printed circuit boards (PCBs). Embedded in at least one of the PCBs may be one or more accelerometers. The accelerometer provides signals to illuminate the LEDs when deceleration is detected. As such, the LEDs are illuminated, specifically, they oscillate when a car slows down and illuminate continuously when stopped, such illumination being clearly visible to other drivers and to pedestrians. It signals to other drivers and pedestrians that the car is decelerating, braking, or coming to a stop.

Different types of accelerometers can be used. In the described embodiment, a one-way accelerometer is used to measure movement on one axis, forward or backward. Two-way accelerometers (measuring movement on two axes) can also be used to indicate deceleration when braking and when turning (assuming the car slows down when it turns).

As noted above, in one embodiment, the license plate frame is an apparatus for visually signaling or in some manner indicating motion, specifically, slowing down, as measured by accelerometers. In another primary embodiment, the frame is an apparatus for visually signaling braking and acts essentially as a front brake light, without the use of accelerometers.

In some embodiments, the power source for the LEDs and circuitry comes directly from the car battery. In other embodiments, the power source comes directly from a brake component, such as the rear brake light or the main brake system of the car, using conventional means, therefore without requiring direct connection to the battery or other power source. A towing hook connector in the vehicle may also provide power. In some embodiments, a solar cell may supply power. As noted, in one embodiment, the power source for the frame may be sourced from power being supplied to the rear brake light. As such, the frame is powered when power to the rear light is supplied. In this embodiment, an accelerometer is not required. The frame LEDs are illuminated when the rear brake light is actuated, fluctuating initially and illuminated continuously when the car has stopped. In an embodiment, power may be provided by connecting to a system board on the car such as an engine control unit (ECU). The frame may be powered by connecting to another device, for example an aftermarket rearview mirror and camera system, which in turn connects to the vehicle, such as to the ECU. Similarly, power may be provided by an original equipment manufacturer (OEM) whose product is incorporated into the vehicle. In other embodiments, the LEDs may illuminate continuously the entire time or oscillate the entire time, even when at a complete stop in an alternative embodiment. In the described embodiment, power for the frame is sourced from the car battery. In other embodiments, any 12 v power supply that is part of the car is feasible. In these embodiments, the accelerometer instructs or dictates when power from the car battery or other source is used to light up the LEDs.

In one embodiment, the accelerometer is on one of the PCBs, which is housed on the left or right side of the frame. There might be two PCBs, one on each side. One of the PCBs contains the logic, a transformer, an accelerometer, and other micro circuitry.

Figure 4:
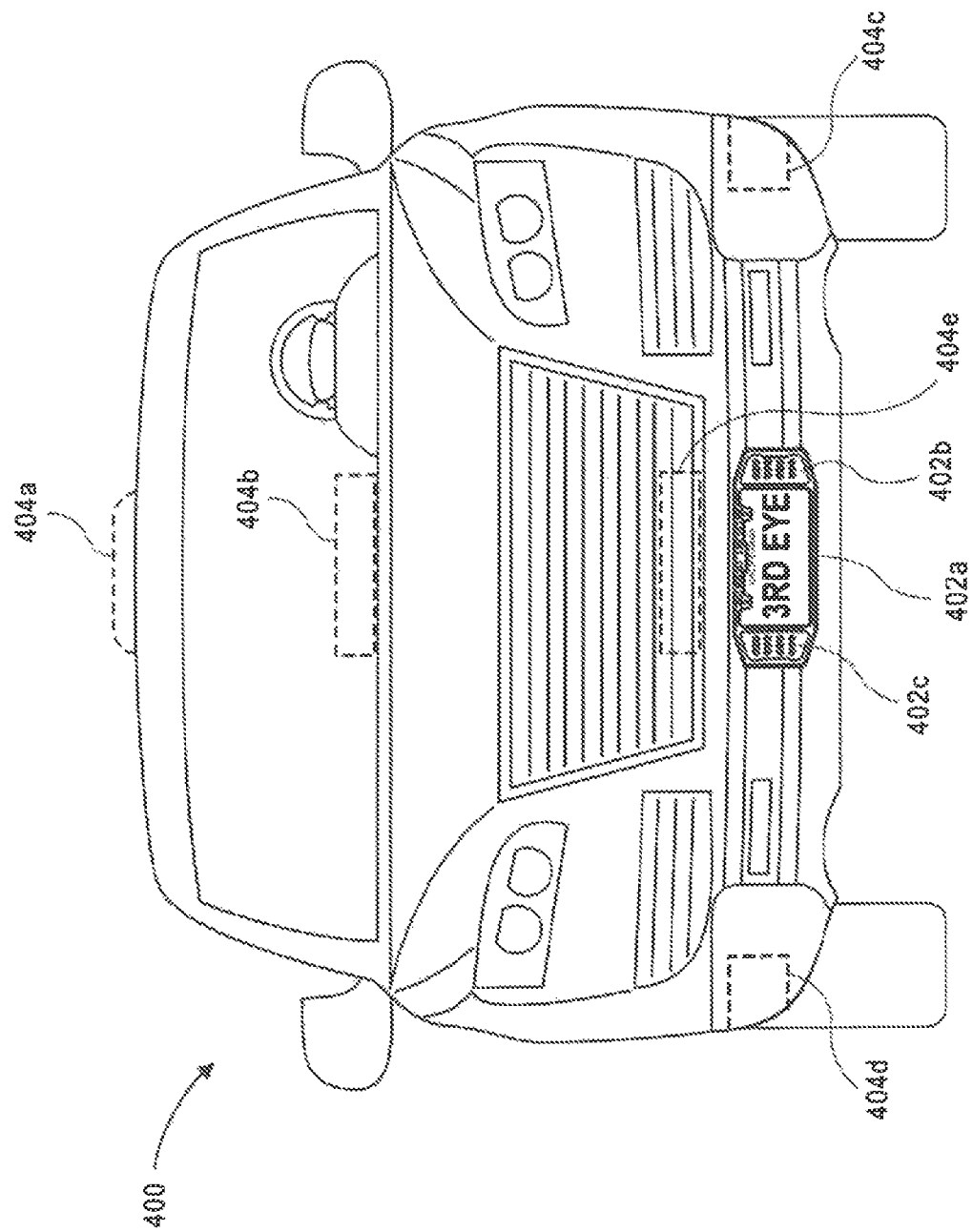
FIG. 4 is an illustration of a front view of a car showing possible locations of the visual deceleration apparatus in accordance with various embodiments.

It is helpful to note that the front visual deceleration apparatus may be made a component of the car during the manufacturing of the car, similar with the embedded nature of the rear brake light. This often referred to as "factory installed". As such, the visual indicator, that is, the LEDs or other light sources, can be installed at any suitable or feasible (from an engineering/manufacturing standpoint) position in the front of the car. This can include being embedded as a light source in the front headlamp compartments, as a light source near or on the rearview mirror, on the roof, or as a light source in the low, center area of the windshield (similar to where the rear brake light is on the rear window). If mounted to the windshield, the device may be mounted on the inside of the windshield, in the passenger compartment, or outside of the vehicle. The apparatus may also be mounted on the front face of a vehicle, such as on the hood, attached to the grill, or attached to the bumper. Some of these embodiments are shown in FIG. 4. The circuitry and wiring of the visual deceleration apparatus, such as the wires going to the battery or to the rear brake light, for example, are installed during manufacture and essentially become part of the car's electrical wiring harness. Other workable locations may include the roof, wheel hubs, and the front of the car, such as on the grill. The illumination device can also be internal or in the interior of the car. In other embodiments, some of the components may be inside and others on the outside of the car.

Again, as described above, the front visual deceleration apparatus might be a front brake light in accordance with specific embodiments. Specifically, the LEDs or other visual indicators come on when the rear brake lights come on. The apparatus can also be characterized as a vehicle deceleration indicator, rather than a braking system, in that it indicates a change in motion or speed of the vehicle. Here, one type of sensor used to signal deceleration is an accelerometer. The sensitivity of the accelerometer can be fine-tuned so that the lights do not come on every time there is a slight deceleration (e.g., when a slight "tapping" on the brake pedal) or when the car comes to a sudden stop (e.g., when "slamming" the brakes). The accelerometers can be adjusted or tuned so that they only send a signal to the LEDs when certain speed or rate of deceleration is detected, a tuning that implements and enables safety goals, described above, without causing false triggers. For example, the LEDs should not illuminate unnecessarily, such as, every time the brake pedal is pressed slightly or pressed for only a short duration (e.g., shorter than 1 second). Regardless of whether the triggering device is an accelerometer of braking components, the instances and amount of time the LEDs illuminate may be similar. In other words, whether using solely braking components, solely accelerometers or other sensors, or a combination of these, the LEDs will illuminate at similar times and stay on for similar durations.

In another embodiment, Bluetooth™ signals may be used to communicate signals between the license plate frame and a braking component in the car. The frame circuitry contains a Bluetooth™ transceiver coupled with a Bluetooth™ transceiver on a brake pedal or other braking component. When there is downward movement of a brake pedal, a signal is sent to the Bluetooth™ transceiver connected to the LEDs. In other embodiments, the frame operates through Wi-Fi technology. A mobile device can be wirelessly connected to a vehicle Wi-Fi system or a close Wi-Fi signal. The mobile device may be activated via the Internet (i.e., over a cellular connection). In yet another embodiment, photo sensors can be used to detect motion of a vehicle or pedestrian in close proximity of the sensor and may illuminate the LEDs in the license plate frame. In another embodiment, audio or voice commands may be used by the driver or other passengers in the car to illuminate the LEDs in the frame. For example, a microphone can detect audio signals (noise or voices) from, for example, a driver when the driver knows when she is going to slow down because of a pedestrian. The apparatus may also include logic to understand voice commands. In other embodiments, the apparatus may include an infrared (IR) sensor to detect heat or otherwise detect pedestrians. A line of sight IR signal may aid the driver in entering into a garage or approaching a wall. The wall or garage may have an IR sensor to help guide the vehicle and trigger illumination of the LEDs in the frame. The apparatus may include an IR sensor, camera, radar, or other motion sensor to detect pedestrians, cyclists, and other objects in the vehicles path. The motion or object detector may cause the frame to illuminate or emit a noise via speakers when pedestrians, cyclists or other vehicles are present. In an embodiment including a photo sensor and a wireless connection such as Bluetooth™ or Wi-Fi, an alarm or video feed could also be provided to the mobile device, dashboard mounted video screen, or other device capable of displaying video. Motion detecting Artificial Intelligence (AI) may be combined with the sensors to refine the accuracy of detection of objects in the vehicles path or to identify objects (e.g., identify pedestrians and cyclists).

One embodiment has the device linked to a corresponding application on the driver's smartphone via any one or combination of Bluetooth, Internet, Wi-Fi and cellular connections. In this embodiment, the device signal light array is activated by the sensors embedded in the drivers smartphone that measure velocity and direction. The application communicates via any one or combination of Bluetooth, Internet, Wi-Fi, and cellular connectivity to activate the signal light array depending on deceleration or acceleration. However, the application also serves a dual purpose if downloaded by users other than the driver. If a pedestrian, cyclist, or scooter rider, and other vehicles has downloaded the app, then they could be alerted by one of several possible notifications (e.g. sound, text, vibration etc.) when an approaching vehicle is not decelerating and poses imminent danger.

FIG. 1 is an illustration of a visual deceleration apparatus in the form of a license plate frame in accordance with one embodiment. A frame 100 has a center section 102 for holding a license plate. Two side sections 104 and 106 display 12 LEDs 108 and 110 in each section. These LEDs illuminate when the vehicle decelerates. Input to the LED circuitry may come from a brake system component, accelerometers, or other types of sensors as described above.

Figure 2:
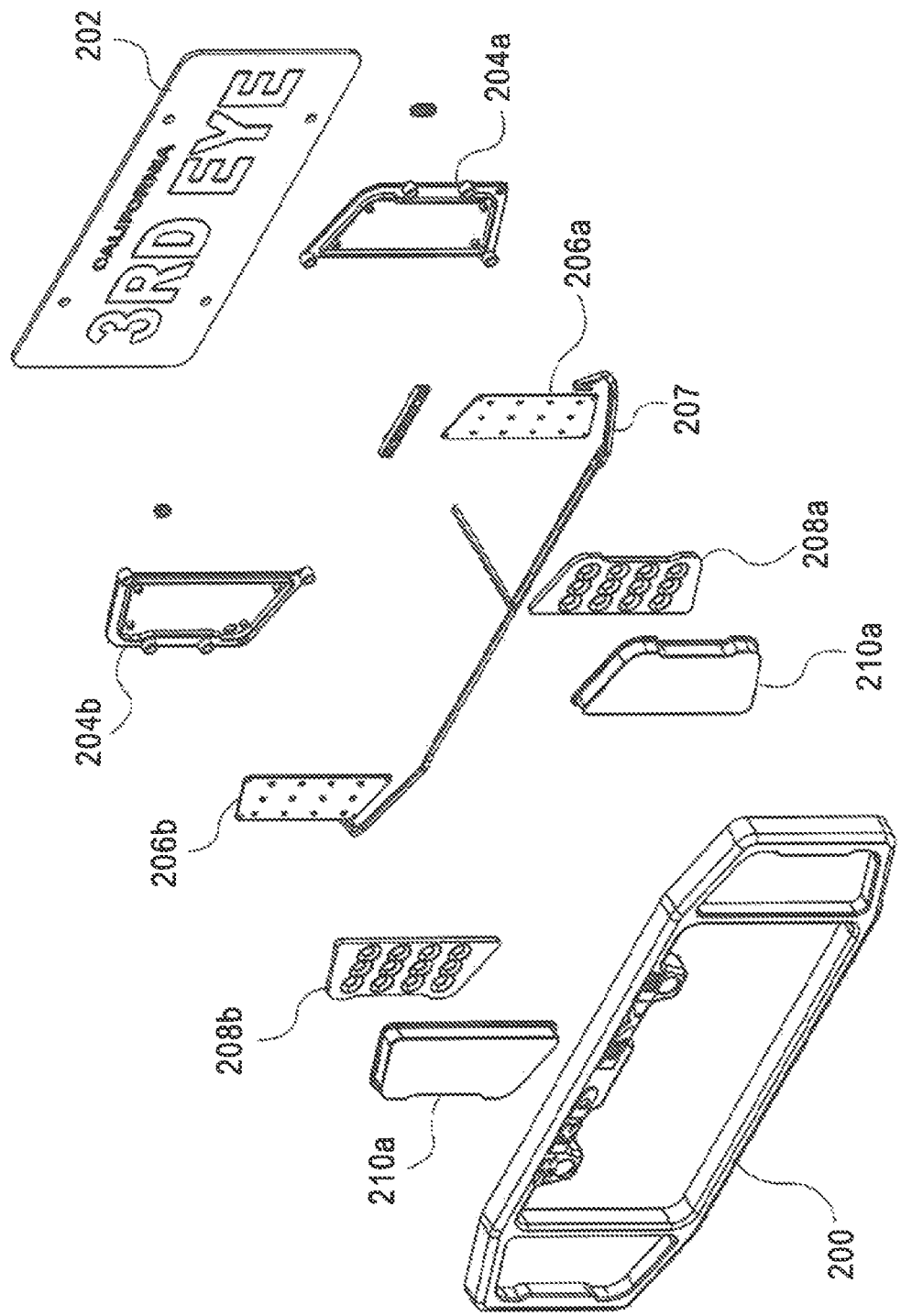
FIG. 2 is a schematic figure showing in more detail components comprising a license plate frame in accordance with one embodiment.

FIG. 2 is a modular drawing showing the various components comprising a visual deceleration apparatus in the form of a license plate frame. A license plate frame 200 secures a license plate 202 in the center section of the frame. Frame 200 has two side sections each containing a rear lens housing 204a and 204b. Two printed circuit boards (PCBs) 206a and 206b, cut to fit in the two side sections, each containing logic, micro-circuitry, and, in one embodiment, 12 LEDs in a 3×4 array of LEDs. In one embodiment, at least one of PCBs 206a and 206b contains at least one accelerometer. Other types of sensors, such as an IR sensor, camera, or other sensors may be contained on the PCBs or elsewhere in the apparatus. A Wi-Fi or Bluetooth™ transceiver may be contained in the apparatus. One or more wires 207 may connect the PCBs to a power source to illuminate the LEDs and power the apparatus. For example, these wires may go directly to the car battery, to a rear brake light sub-system, or to both. More generally, the wires may go to any suitable power source in the vehicle. Layered on top on the PCBs, to protect the circuitry and more specifically to magnify illumination from the LEDs, may be two reflectors 208a and 208b, each having 12 openings positioned the same as the LEDs, as shown in the figure. Covering reflectors 208a and 208b are lenses 210a and 210b, which also help magnify the LEDs. The LED arrays fit securely in the two side sections of the frame and are coupled with rear lens housings 204a and 204b.

Figure 3:
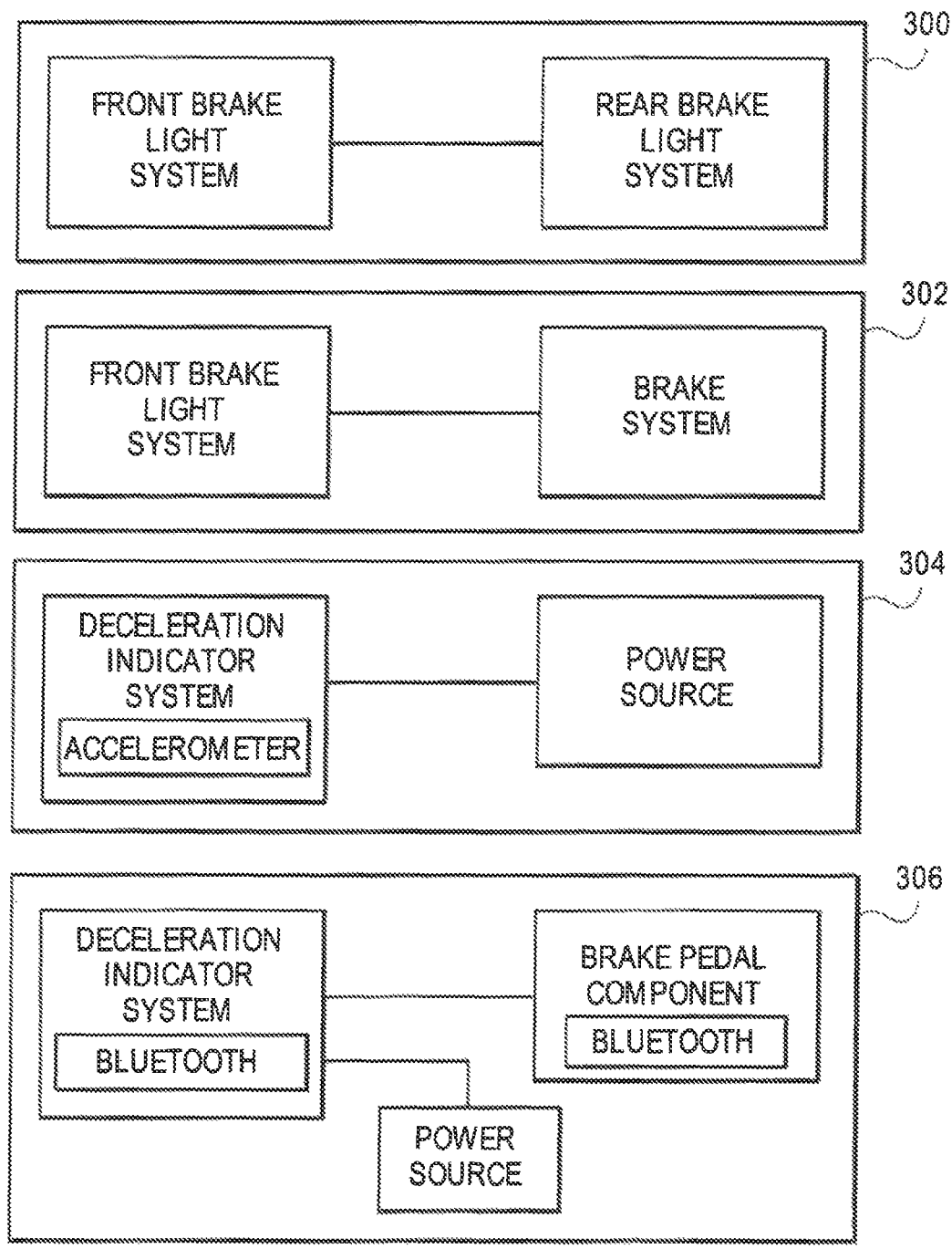
FIG. 3 is a block diagram showing multiple configurations of the apparatus, power supply, and brake components in accordance with various embodiments.

FIG. 3 is a block diagram showing example configurations of visual deceleration apparatus connected to other components of the car in accordance with various embodiments. In configuration 300, the deceleration illumination apparatus is characterized as a front brake light system. It is actuated by and draws power from the car's rear brake light sub-system (a "sub-system" of the car's larger, overall brake system). When the rear brake light comes on, the front brake light LEDs and other indicators are triggered or actuated. Various possible positions of the front brake lights are shown in FIG. 4. Configuration 302 is similar to 300 in that the deceleration apparatus is characterized as a front brake light system. It is connected with the car's braking system, which powers it and provides an actuation signal to the LEDs when the car's brake is applied. The same actuation signal may be used to actuate the rear brake light sub-system.

In another embodiment, the front visual deceleration apparatus is not connected or dependent in any way with the car's brake system. In configuration 304, the apparatus is characterized as a deceleration indicator system and draws power directly from the car's battery or other suitable direct current (DC) power source in the car. The PCBs contain at least one accelerometer, which may have one-way or two-way capabilities. As described above, the accelerometer signals or actuates the LEDs when the vehicle is slowing down. The sensitivity of the accelerometer may be tuned such that a signal is sent when the car is slowing down at a certain rate. It is useful to note that the car can decelerate at that rate without necessarily having the brakes applied. Other embodiments make use of at least accelerometers, rear brake lights, and brake systems, or combinations thereof. For example, one embodiment may use accelerometers to actuate the LEDs and also draw power and receive an actuation signal from a brake component.

In other embodiments, other suitable technologies for communicating an actuation signal may be used. One example is shown in configuration 306. Here the deceleration indicator system has a Bluetooth™ transceiver that is connected and paired with another Bluetooth™ transceiver that is connected to a braking component, such as a brake pedal. When the brake pedal is pressed, for example, a signal is sent to the Bluetooth™ component in the license plate frame. The deceleration indicator system is powered by, for example, the car battery or other source as in configuration 304. As mentioned, configuration 306 is merely one example of using alternative technologies to actuate a front visual deceleration system. The use of other technologies, such as those described above ay involve additional components.

FIG. 4 is an illustration showing the front of a car and locations of the front light apparatus in accordance with various embodiments. A car 400 is used for illustration. The apparatus described herein can be used on numerous other motorized, electric, and non-motorized moving vehicles, includes bicycles. Examples of motorized vehicles include but are not limited to motorcycles, all-terrain vehicles (ATVs), cars, trucks, vans, and buses. Vehicles may be personal vehicles, commercial vehicles (e.g., taxis and limousines), or operated by a government (e.g., police, fire, emergency, and military vehicles). In the described embodiment, the visual deceleration apparatus is in the form of a license plate frame having a center section 402a containing a license plate and two side sections 402b and 402c that contain the LEDs, PCBs, micro-circuitry, and in some embodiments, at least one accelerometer, Bluetooth™ transceiver, or other type of sensor as described above. Other possible locations of the visual deceleration apparatus are shown: on the roof of the car 404a; in the car at the front center windshield 404b (either interior or exterior); as a part of or near the front headlamp 404c-d; and on the grate 404e. There are other possible locations for the apparatus inside the car or for some of the components of the apparatus to be interior. For example, a microphone or other sensor that rely on input from the driver or passenger may be inside the car and other components, such as the LEDs outside and at multiple locations. In yet another embodiment, the LEDs may not be fully frontal but on the sides (e.g., the left and the right side of a vehicle), such as on wheel hubcaps, side view mirrors, or other locations on the side of the car that are clearly visible to pedestrians about to cross in front of the car. In the various embodiments, a method of illuminating the LEDs on the car as described above is described. A method of illuminating LEDs on a license plate frame includes steps of detecting a deceleration of the vehicle using an accelerometer in the frame. This detection causes the transmission of a signal from the accelerometer to circuitry in the frame. This actuates the LEDs in the frame upon deceleration. In another embodiment, the signal to the LEDs and circuitry comes from the rear brake light system as described above. In yet another embodiment, the signal may come from a sensor, such as one of the multiple types described above, to activate the LEDs.

Figure 5:
FIG. 5 is a frontal view of a variation of a license plate frame wherein light emitting diodes (LEDs) in an LED strip are arrayed horizontally above a license plate.

FIG. 5 is a frontal view of a variation of a license plate frame wherein LEDs in an LED strip are arrayed horizontally above a license plate. As used there, a lamp 502 includes an array of LEDs that light up to signal a vehicle state to pedestrians and other vehicles. A framework for implementing patterns of light intended to signal to a pedestrian, cyclist, or other person in front of the vehicle that the vehicle is slowing down, remaining the same speed, or speeding up is described below.

FIG. 6 illustrates a protector bar 504 and placement of several protector bars over an LED array 502. On the left of FIG. 6, a side view of a protector bar 504 is shown. The curved portion of protector bar 504 would face forward of the vehicle and would provide protection to LED array 502 in cases where the vehicle bumps another vehicle, a person or an object. Being rounded, it would not unduly damage persons or objects in low-speed collisions. The straight part of protector bar 504 might be mounted behind LED array 502. On the right side of FIG. 6, LED array 502 is shown being protected by six protector bars 504. Fewer than six or more than six protector bars might be used.

FIG. 7 illustrates different light colors and their meanings. In state 702, the indicator might be amber to indicate that the driver is braking, whereas in state 704, the indicator might be white to indicate that the alert system is on, but the driver is not braking. Other colors are possible, such as a color or an oscillating pattern) to indicate that the vehicle does sense a pedestrian or object in front of the vehicle to provide additional information.

Figure 8:
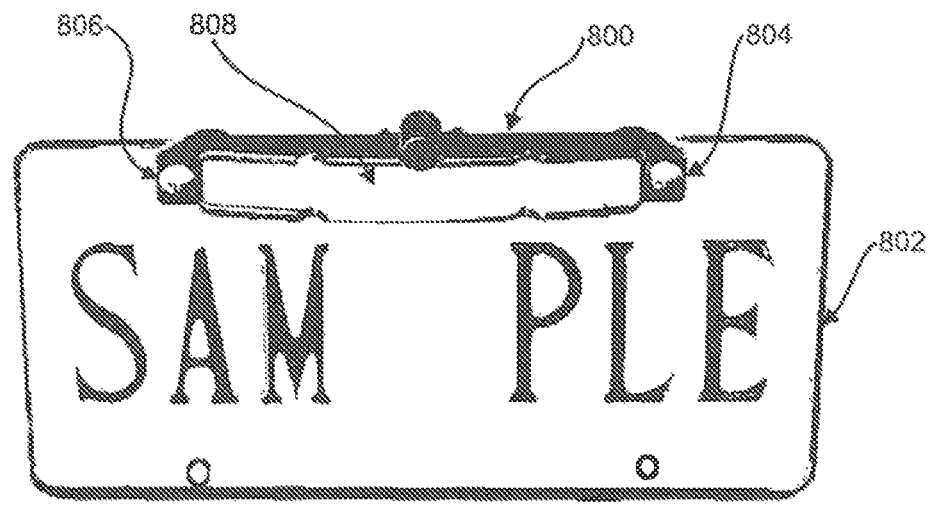
FIG. 8 illustrates a frontal view of a housing containing a strip of LEDs mounted to a license plate.

FIG. 8 is an illustration of a visual detection apparatus in the form of a housing that mounts to a license plate in accordance with another embodiment. The housing 800 attaches to license plate 802 via screws 804, 806. The embodiment may also be mounted to or integrated into a license plate frame. It may also be mounted to another part of the vehicle, such as the grill. The housing 800 has a center section 808 holding a lens with LEDs mounted behind the lens. The LEDs illuminate and are powered as discussed above with respect to other embodiments. The device may illuminate when braking or decelerating, may illuminate in a different color under braking or decelerating, and may detect braking or deceleration in a variety of ways as discussed above.

Figure 9:
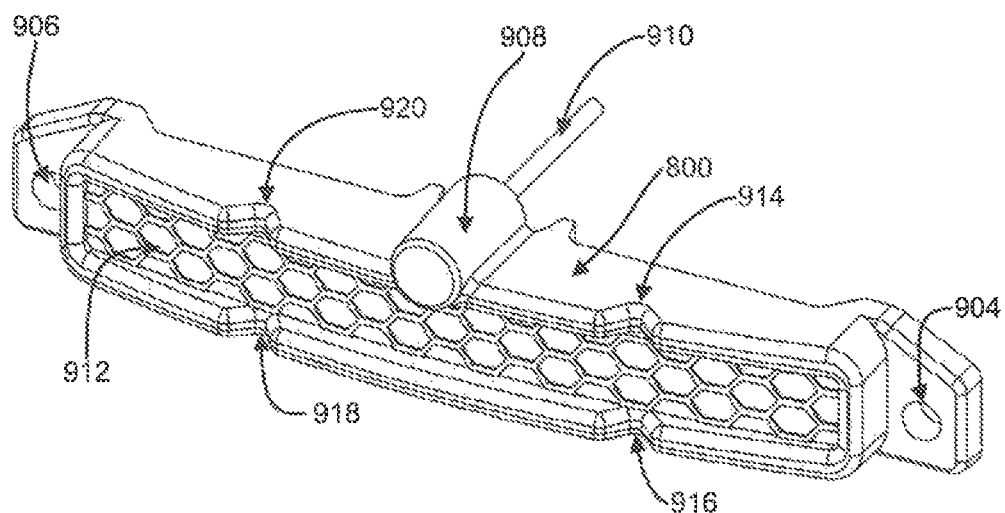
FIG. 9 is a more detailed view of a housing for mounting to a license plate.

FIG. 9 is a detail of the embodiment shown in FIG. 8. The housing 800 has two holes 904 and 906 that accept screws 802 and 804 (shown in FIG. 8). The housing 800 has a raised portion 906, or alternatively a fairing, to receive an electrical connection connected to wire conduit 910. The housing holds a lens 912. In Some embodiments, the lens may be clear, amber, or another color. In the embodiment shown, lens 912 is clear or translucent. The housing 800 has four indents 914, 916, 918, and 920, which increase the flexibility of the housing, should it be pushed on, for example by another vehicle which is parallel parking. The indent allows the leading edges of the housing 800 to flex. Advantageously, the housing flexes and absorbs some impact to protect the lens 912, as well as protecting the front of the vehicle from minor scratches and dents. In some embodiments, the housing may be made of a hard rubber or plastic to enhance its shock absorption capabilities.

Figure 10:
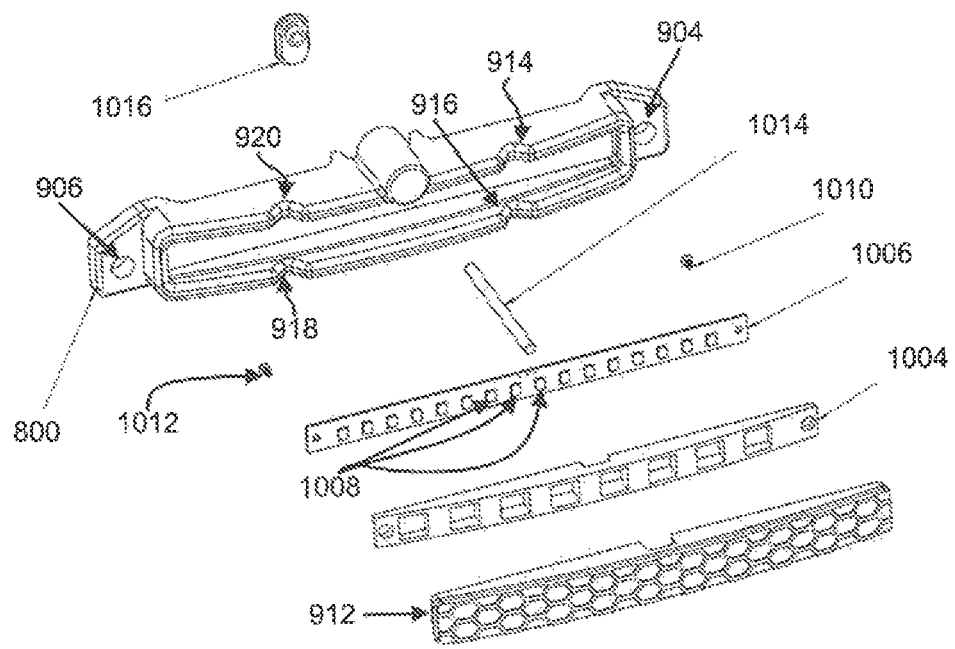
FIG. 10 is a schematic view showing in more detail components comprising a housing for mounting to a license plate in accordance with one embodiment.

FIG. 10 is a modular drawing showing the various components comprising a visual or auditory deceleration apparatus in an embodiment to be mounted to the front of a vehicle at the top edge of a license plate. In the embodiment of FIG. 10, the apparatus emits two colors of lights, for example white light when not braking or decelerating and amber light when braking or decelerating, in one embodiment, this is accomplished by amber and white LEDs. In the embodiment of FIG. 10, this is accomplished using white LEDs, some (e.g., half) of which shine through an amber lens 1004. The amber lens 1004 is located between the clear lens 912 and a PCB 1006. The PCB 1006 has sixteen LEDs, though more or fewer could be used, three of which are labeled 1008. PCB 1006, amber lens 1004, and clear lens 912 may be held together by two screws 1010 and 1012. In other embodiments, adhesives or other fastening systems may be used. The assembled PCB, amber lens, and clear lens may be mechanically or adhesively attached to housing 800. Power is supplied to the PCB by a wire 1014. In the embodiment shown, the wire is routed to a plug 1016 that receives power from wiring (not shown) attached to the vehicle.

Figure 11:
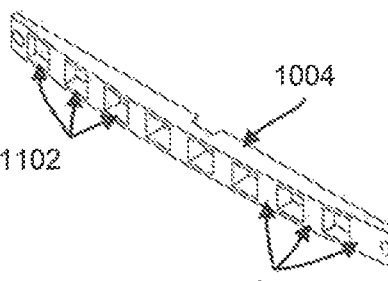
FIG. 11 is a detailed view of a colored lens for use with a housing for mounting on a license plate.
Figure 12:
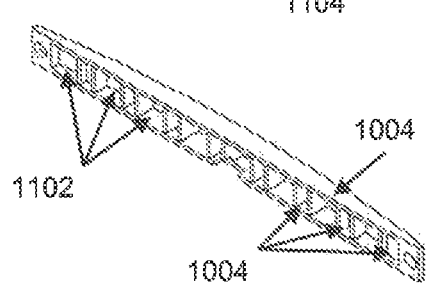
FIG. 12 is a different angle view of a colored lens for use with a housing for mounting on a license plate.

FIG. 11 and FIG. 12 show the amber lens 1004 from different angles to illustrate that it has openings (three of which are labeled 1102) to allow the light emitted from white LEDs 1008 to pass through uncolored and solid portions (three of which are labeled 1104) which filter the white LED to amber. The solid portions and openings alternate across the LEDs 1008. By illuminating the covered LEDs, amber light is emitted. By illuminating the LEDs that shine through the openings, white light is emitted. The covered and uncovered LEDs alternate across the PCB 1006 to provide similar amounts of illumination when either set of LEDs is illuminated.

As mentioned above, a lighting pattern is displayed on the front of the vehicle when the vehicle is in motion. In one embodiment, a lighting pattern may include lights that fluctuate (with respect to luminosity) or lights that stay on at the same luminosity, that is, lights that do not fluctuate but are on consistently at the same level of brightness, referred to herein as lights that are solid. A vehicle front alert system allows for improved perception of speed of an approaching vehicle, human, or object. This allows humans better decision making capabilities when walking (e.g., deciding whether to cross the road), or driving (e.g., making a left turn across traffic).

Figure 13:
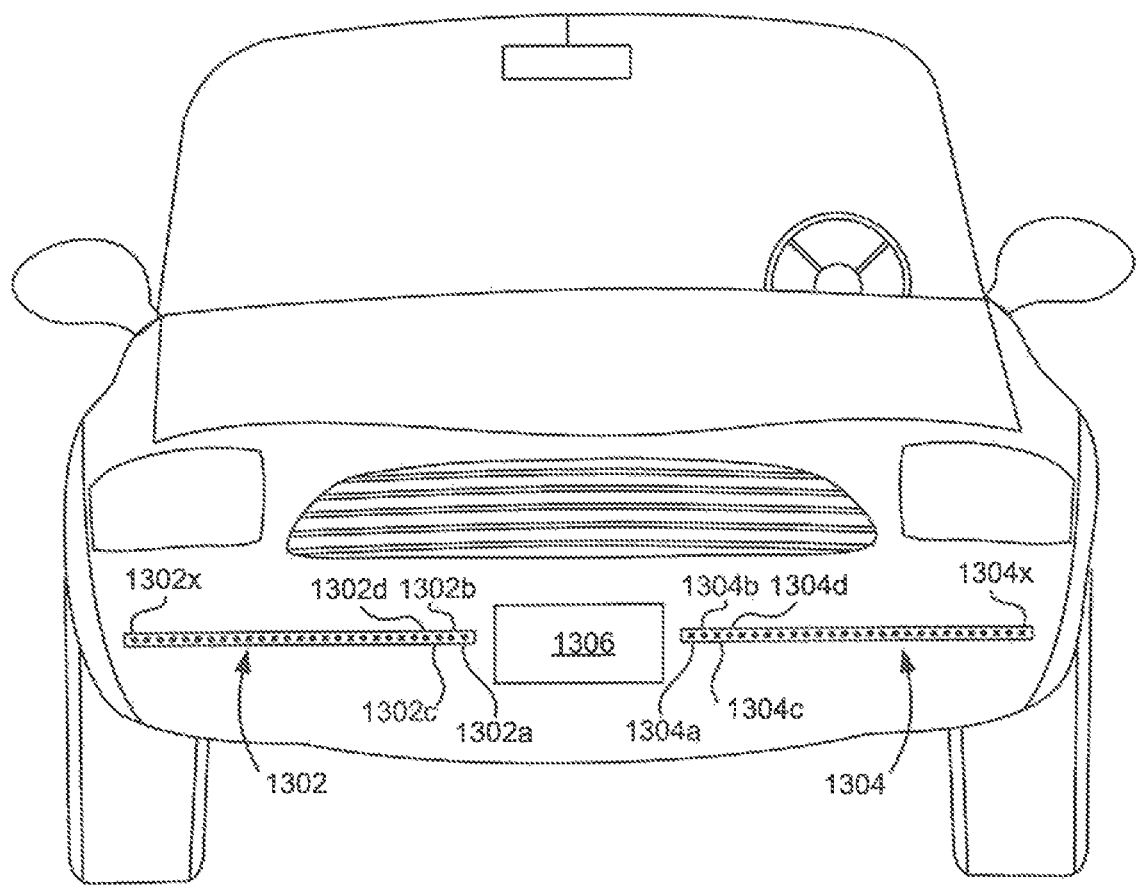
FIG. 13 shows an example of one configuration of light arrays, also referred to as light strips, on the front of a vehicle in accordance with one embodiment.

FIG. 13 shows an example of one configuration of light arrays, also referred to as light strips, on the front of a vehicle. The light strips are components of a vehicle front alert system ("VFAS"). In one configuration, there are two light strips or arrays, 1302 and 1304, strip 1302 has one end at the left side of a license plate frame 1306 and strip 1304 has one end on the right side of frame 1306. If there is no frame, the ends start at right of center and at left of center of the front of the vehicle. Light strips 1302 and 1304 extend to the left side of a front bumper and to the right side of the bumper. Light strip 1302 includes a plurality of lamps, such as LEDs, shown as 1302a, 1302b, 1302c, 1302d, and up to 1302x. Light strip 1304 includes a plurality of lamps, such as LEDs, shown as 1304a, 1304b, 1304c, 1304d and up to 1304x. Light arrays 1302 and 1304 having fewer or more lamps as those shown may be placed at other locations on the front or sides of the vehicle, such as on the outside of a front automotive window glass or pane, on the back of a side view mirror component (the non-mirrored side a person would see if facing the front of a vehicle), on top of the vehicle, around the license plate frame, added to exterior trim of the vehicle, on the center of the front grille or grate (of a traditional car grille or an electric car grille), and so on. It may also be on the back. In one embodiment, LEDs may be on the inside of a front window glass including along the perimeter or at any suitable location on the inside of the pane. In another embodiment, LEDs or other types of light component may be embedded inside the window panes or be laminated in the glass. The lights can be embedded in the front bumper or rear bumper of a vehicle or maybe on the front hood or rear of the vehicle. Light arrays 1302 and 1304 need not be configured linearly. For example, they may be around the circumference of license plate frame 1306 or around side view mirrors, around the windshield, among other places. In another embodiment, the light arrays may be in the headlamp compartment of a vehicle and may function as daytime lamps when over the threshold speed. The LED strips may be arranged in any desirable configuration on the vehicle. The variety of locations described above allow for design freedom based on the architecture of the vehicle, while still maintaining clear line of sight for all road users. In another embodiment, the lighting pattern may be on the rear of the vehicle.

In one embodiment, the lamps illuminate either a white light or an amber light. In other embodiments, the lamps may be any color that is allowed in the jurisdiction, country, or area where the vehicle is being driven, such as cyan or turquoise. Different colors may be used to communicate different messages to pedestrians, cyclists, and other objects in the connected car infrastructure, as described in more detail below. When the vehicle is in motion (and the pedestrian safety system of the present invention is on) and moving at a speed of 30 mph or higher, light arrays 1302 and 1304 are on continuously and illuminate white light. That is, each of the lamps 1302*a-x* and 1304*a-x*, is powered and illuminate white light (with no fluctuating). In other embodiments, the threshold speed can be greater or less than 30 mph. When the vehicle drops below 30 mph or whatever the threshold speed is, a light pattern on arrays 1302 and 1304 is triggered or goes into effect. The lamps in the arrays transition from being on continuously and illuminating white light to fluctuating, as described below, and illuminating amber light. Fluctuating, in this context, may be described as a visual or optical effect of a trail of light going "back and forth" horizontally in a linear fashion on each of light arrays 1302 and 1304; that is, light going from left to right and right to left on each array at varying speeds or rates of fluctuation. As noted, the pattern may not be linear, but may be of any suitable, effective, or desired design or configuration.

In another embodiment, a solid lighting color, such as amber or white, to note just examples, may communicate to a pedestrian, cyclist, or other entity that the vehicle is decelerating. Another solid lighting color, such as white, may communicate that the vehicle is accelerating. As noted, other colors may be used depending on the jurisdiction and local laws. To illustrate this embodiment, the VFAS light arrays 1302 and 1304 are in a headlamp compartment and the light arrays function as a visual vehicle speed indication means and as daytime lamps when the vehicle is at a certain means. For example, a vehicle may start from being still (such as from at a stop sign, a red light, or from being parked, and so on) and accelerate. During the acceleration period and until the vehicle gets to a threshold speed (e.g., 30 mph), the VFAS light array/daytime light arrays lamps are a solid color, such as amber (or any suitable or allowed color for that jurisdiction), As such, as the vehicle accelerates, the light arrays remain this solid color (no fluctuation or flashing). When the vehicle reaches the threshold speed, the color of the VFAS/daytime lamps change to a different solid color, such as white. And at this stage they function as conventional daytime lamps for the vehicle (in most cases this would suggest that they change to white or other acceptable daytime lamp color).

When the vehicle slows down or decelerates, the daytime lamps change from white, for example, to a solid amber, cyan, green, or another color when it slows down after passing the threshold speed (before that they are still white or other daytime color and are solid). At this stage the lights function as VFAS light arrays and the new solid color indicates to pedestrians, cyclists, and others that the car is slowing down and will remain that solid color until it comes to a stop.

If the vehicle switches from deceleration to acceleration and starts speeding up, the solid ("slowing down") color switches to yellow or whichever color is being used for acceleration ("speeding up" color). In this embodiment, the VFAS lighting apparatus has at least three different colors: one to indicate acceleration from 0 to threshold speed, another to indicate deceleration from threshold speed to 0, and another for daytime lamp functionality when the vehicle is moving faster than the threshold speed.

In the described embodiment, the system is using the speed of the vehicle to determine the lighting pattern and color. In other embodiments, other means of determining vehicle acceleration may be used. For example, the OBD2 port of the vehicle may be used to get speed and acceleration data. In another example, one or more wheel speed sensors may be used to determine vehicle speed and accelerometers may be used to detect acceleration. All these data, alone or in combination, may be used to operate the lighting pattern.

As a general principle, this rate of back and forth is high when the car is going faster (e.g., in the high 20s, if 30 mph is the threshold) and slows down as the car slows down. The intended purpose is that a pedestrian, cyclist, or opposing vehicle sees the light pattern fluctuation decreasing as a vehicle approaches, for example, a cross walk or STOP sign, and as the vehicle decelerates the fluctuation slows down indicating that the vehicle is slowing and possibly stopping. This change in rate of fluctuation is a clear visual indication to the pedestrian, cyclist, or opposing vehicle that the vehicle is slowing down as required (for the STOP sign, cross-walk, red light, etc.) and that it may be safer for the pedestrian to proceed.

In one embodiment, a light pattern can be described in terms of each lamp in an array being supplied power for m seconds and the next lamp in the array (adjacent lamp) being powered on after n seconds of the previous lamp being powered off. In other words, an LED is supplied power for m seconds and the next LED in the array is powered on after n seconds of the previous LED being powered off and stays on for m seconds. The illumination from an LED or other type of light source (e.g., halogen, fluorescent, or incandescent) may last longer than m seconds, that is, the light may take a varying amount of time to dim and stop illuminating light. The m seconds is an indication of how long the LED, or whatever type of lamp it is, is provided with power. And the n seconds (time between power to each lamp) starts as soon as the power is stopped to the previous lamp (not when it necessarily stops illuminating or its dimming period is over).

In one embodiment, where VFAS light arrays 1302 and 1304 display a solid, non-fluctuating color, the value of m is set to what can be characterized as a "constant on" time value. In other words, the time value of m is irrelevant to implementation given that the LEDs are always on. In contrast, the value of n is set to zero given that all the LEDs are on at the same time so powering one off before powering the next LED is not relevant to implementation. These two values for m and n make VFAS light arrays 1302 and 1304 display a solid color. In this embodiment, the light arrays 1302 and 1304 are implemented in a headlamp compartment of a vehicle and, the light arrays may also function as daytime lamps.

The values for m and n depend on the deceleration or acceleration of the vehicle. When a car first starts decelerating, the fluctuation begins and the rate of fluctuation is at the high end (i.e., the lights are going back and forth quickly) but the rate slows down as the vehicle decelerates. As such, the fluctuating rate will be higher when the vehicle is decelerating, for example, from 30 mph to 20 mph and will be mid-range when the vehicle, as an illustration, is decelerating between 20 and 10 mph. The rate of fluctuation will decrease as the vehicle's speed decreases. It may be solid (non-flashing) when at a stop. Similarly, the rate of fluctuation of the lights increases as the vehicle accelerates. In the first instance, as the vehicle decelerates the lamps provide, for example, amber or cyan colored, fluctuating illumination that turns to solid amber or cyan when the vehicle comes to a stop. In the second instance, as the vehicle accelerates from a speed below 30 mph up to 0 mph or higher, the lamps provide white fluctuating illumination that turns solid upon reaching 30 mph or whatever the threshold speed is or upon reaching a steady speed. In another embodiment, VFAS light arrays 1302 and 1304 remain a solid color when accelerating up to 30 mph or threshold speed and a different solid color when decelerating from the threshold speed down to 0 mph. The solid color of the VFAS light arrays changes if the vehicle accelerates or decelerates when between 0 and threshold speed. In one embodiment, for example when the light arrays are in a headlamp compartment, the solid color switches to a suitable solid color to function as daytime lamps.

As noted above, the system may not have access to vehicle speed data in which case using a threshold speed may not be workable. In another embodiment, an accelerometer can provide data to inform and control the color of the lighting, whether the lighting is solid (i.e., no fluctuation) indicating no acceleration or deceleration, or fluctuating indicating some level of acceleration or deceleration. For example, as a vehicle begins to decelerate the lighting may show amber lighting fluctuating at a high rate. As the vehicle continues to decelerate this fluctuation will continue to slow. When the vehicle has reached a steady speed, the lighting may switch to solid amber lighting and remain this way until the onset of the next acceleration or deceleration. If the vehicle begins to accelerate, the lighting may then switch to white lighting fluctuating at a slow rate. As the vehicle continues to accelerate this fluctuating will continue to increase in rate. When the vehicle has reached a steady speed, the lighting may switch to solid white lighting and remain this way until the onset of the next acceleration or deceleration. In another embodiment, the reverse may be implemented: a solid color when accelerating or decelerating and a fluctuating pattern otherwise or no lights at all when at a consistent speed.

FIGS. 14 and 15 show graphs demonstrating implementation of the embodiments described above. They show that lighting activation depends on acceleration. Graph 1400 in FIG. 14 shows acceleration in meters per second squared on the y-axis and time in seconds on the x-axis. The line in the graph shows acceleration of a vehicle initially slowing down followed by a constant speed (zero acceleration). During this stage of the operation of the vehicle, the color, such as amber, is solid. When the vehicle begins increasing speed, that is, accelerating, followed by a slow down to zero acceleration and no speed increase, the lighting is a different color, such as white, and is solid. Thus, FIG. 14 shows a lighting activation system where the lights are solid. Graph 1500 in FIG. 15 shows acceleration in meters per second squared on the y-axis and time in seconds on the x-axis. The line in the graph shows acceleration of a vehicle initially slowing down followed by a constant speed (zero acceleration). During this stage of the operation of the vehicle, the color, such as amber, is fluctuating when acceleration is not zero. When the vehicle does not change speed and acceleration is zero, the solid amber lighting changes to fluctuating amber. When the vehicle begins increasing speed, that is, accelerating, followed by a slow down to zero acceleration and no speed increase, the lighting is a different color, such as white, and is fluctuating when acceleration is not zero and becomes solid white when acceleration is zero.

When the fluctuation is high, the values for m and n are higher than their values would be when the fluctuation is lower. For illustration, for a fast fluctuation, m and n may be 0.5 seconds and 0.3 seconds, respectively, and for a slower fluctuation, m may be 2 seconds and n may be 1.5 seconds. The change from 0.5 to 2 seconds for m and 0.3 seconds to 1.5 for n seconds may occur gradually as the vehicle decelerates. This would result in the "back and forth" of the lights on the arrays from being rapid to slowing down as the vehicle decelerates. This slowing down of the lighting pattern tells pedestrians and other vehicles that the vehicle is slowing down.

When the vehicle accelerates, the values of m and n increase. In one embodiment, for both acceleration and deceleration, the values for one of the variables, such as m, may change (i.e., not be constant) and the value of the other, n, may remain the same. This can still provide the slowing down or speeding up of the back and forth of the lights, but would have a different visual effect as it would if both values, m and n, were decreased or increased at the same time. Of course, the values for m and n can vary widely, from a few microseconds or milliseconds for each lamp to several seconds. The values would likely depend significantly on the type of lamp source, the number of lamps in the light array, the configuration, lighting pattern desired, and position of the light array or arrays on the vehicle, among other factors.

In one embodiment, the range of values for m and n is from 0.001 second to 5 seconds. The rate of fluctuation is dependent on how quickly the vehicle decelerates or accelerates. As described, if the vehicle decelerates quickly, the back and forth of the lights slows down quickly. If it slows down at a lower rate, the fluctuation of the light array will slow down or go back and forth at a slower speed. If the vehicle accelerates fast, the fluctuation rate will also be fast and if it accelerates at a slower rate, the fluctuation of the lights will be slower. The objective is to have the fluctuation (e.g., the back-and-forth of the lights powering on and off) indicate clearly to a pedestrian or another vehicle that the vehicle is slowing down, speeding up, or remaining at the same speed. This clear and prominent visual indication to a pedestrian may be made more effective the higher the number of lamps in the light arrays. This would provide a more focused and animated lighting pattern, thereby making it easier for pedestrians and others to see and perceive. The amount of fluctuation of the lighting correlated with the rate of acceleration or deceleration allows for a continuous understanding of the change of speed, further improving decision making capabilities. The variables, m and n, as well as the number of lamps in each array and the amount of time it takes each lamp to stop illuminating light once power is stopped, are all factors to consider when implementing a light pattern or sequence. This light pattern may be different depending on the type of vehicle, configuration of the front or rear of the vehicle (e.g., type of bumper, front grille, license plate frame, etc.), and other factors.

As noted, in other embodiments, the amount of time that each lamp or light source is powered on is not constant and the amount of time between a lamp being powered off to being powered on is also not constant. That is, one lamp may be powered on for m seconds and another lamp may be powered on for m+x seconds or m−x seconds, where x is variable. As such, a lamp may be on for 0.5 seconds and another lamp may be on for 0.53 seconds or 0.45 seconds. That is, each lamp can be powered on for a different length of time or a group of them may be on for a first length of time, a second group may be on for a second length of time, and so on.

In this embodiment, the lighting sequence or pattern may not visually appear consistent as it would be in the other embodiments where each lamp is on for m seconds and the amount of time between lamps is n seconds. In another embodiment, the time between lamps being powered on may also vary. For example, the time between lamps being powered may be n+y seconds or may be n−y seconds where y can vary. For example, the time between power off and power on of two adjacent lamps in an LED strip may be 1.3 seconds and the time between the next two adjacent lamps may be 1.15 seconds or 0.9 seconds. In these embodiments, the lighting sequence or pattern may not appear consistent depending on the range of values for x and y. The lighting sequencing can be programmed using constants m and n modified by variables x and y. In this manner, the lighting sequence can be made constant or regular by only using the constants m and n and made variable using x and y. In another embodiment, only variables x and y are used to program the lighting sequence. The sequence can be made consistent or regular by setting x to be the same for each lamp and setting y to be the same for the time between powering adjacent lamps.

In another embodiment, the lighting component, such as an LED array and the VFAS of the present invention (also referred to herein as alert system or visual deceleration apparatus) may be used in other contexts. These use cases can vary widely. For example, in one embodiment VFAS may be on a helmet of a cyclist. The lighting on the helmet can follow the same principles and operation as the light arrays on a vehicle described above. That is, the lighting sequence may increase in speed, fluctuation, or blinking if, for example, a cyclist is accelerating. The lights decrease if the cyclist slows down. Although cyclists are the primary embodiment for a helmet VFAS, helmets can be used by any person operating a wide variety of micromobility transportation means. In another use case, the lights are placed on the front of a micromobility mode of transportation, such as a scooter, cart, or other modes of transportation. In the use case of a helmet or clothing the accelerometer may be on rider, on the helmet or on the bike. The VFAS may have its own power source and sensors in the helmet.

The helmet is a self-contained alert system and visual deceleration apparatus. It has an LED strip or array configured horizontally along the top of the front of the helmet so that people or vehicles in front of the cyclist (as one example) can see and perceive whether the bike is slowing down or accelerating or staying the same speed. The lights on the helmet can be activated from accelerometers and other sensors. There may also be wireless communication between the bike braking apparatus and the helmet alert system.

The main embodiment described for VFAS has been a passenger vehicle, such as a conventional gas powered car or electric vehicle. However, VFAS can be used in a wide variety of transportation and deliver means. A few include, but are not limited to, buses, vans, electric bikes, electric scooters, carts, trains, motorcycles, sidewalk delivery robots, drones, wearables, among many others. The vehicle or transportation means may have a human driver or be autonomous or have some degree or level of autonomy. The location of the lighting apparatus or component of VFAS can also vary widely and, naturally, will depend on type of vehicle or mode of transportation or delivery being used. For example, on a train or bus, the lights may be somewhere on the side doors of trains or buses to let passengers know that the train or bus is slowing down or accelerating. Several locations are noted above with regard to where the lights can be placed on a conventional vehicle.

In one embodiment, the vehicle, being in a connected car infrastructure or environment, may use VFAS to send messages to other objects in the infrastructure. For example, VFAS components, including the lights, may be used to send a Basic Safety Message (BSM) to sensors, smartphones, traffic lights, pedestrian cross signals, among other objects or things in the connected car infrastructure. In this vehicle-to-object environment ("V2X"), a BSM can relay position, velocity, acceleration, and mass to other entities and things in the infrastructure. This data can be communicated, for example, using a cellular network, such as a 5G network. As such, in addition to the visual appearance of the lights in the VFAS, the apparatus can communicate other messages (BSM being one example) to the vehicle's environment.

In another aspect of the invention, the VFAS components described in FIGS. 13 to 15 above can be wholly or partially housed in the headlamp compartments of a vehicle. For example, a headlamp compartment provides numerous types of lighting for a car, such as daytime running lights, fog lights, high beams, and others. More current headlamp compartments provide additional functionality and these are referred to sometimes as "smart" daytime lamps because they provide non-conventional features, for example, turn signaling. Another feature that smart headlamp compartments and their internal configurations can offer is VFAS functionality.

The VFAS system, regardless of where it is placed, within or outside of a headlamp compartment, still performs functions described above, such as V2X communications and BSM messaging, for example. As noted, another category or type of lighting the compartments can house is the VFAS lighting apparatus with certain differences. The basic concepts of the lighting apparatus with respect to its operation remain the same. That is, light strips 1302 and 1304 indicate to a person or object via lighting sequences and patterns whether the car (or other vehicle or transportation means) is slowing down, accelerating, remaining at a constant speed, or stopping.

FIG. 16A is an illustrative diagram of the front of a vehicle in accordance with one embodiment. Illustration 1600 is the front view of a vehicle. Typically, there is a grille area 1604. It should be noted that some vehicles will have a conventional grille, in particular gas-powered vehicles, while others, such as EVs and other transport modalities, may not. An increasing number of vehicles, especially EVs, will not have a conventional grille but rather sensors or other components (e.g., a plate with no openings) in area 1604. There may also be an area 1606 for an OEM logo or design. In other embodiments, there may not be a logo or design. There are two headlamp compartments 1602*a* and 1602*b*. These compartments house various types of lamps, bulbs and other lighting apparatus conventionally needed for vehicles. These compartments have their own circuitry and electrical connections to power sources within the vehicle.

The shape of compartments 1602a and 1602b may vary. In one embodiment, they may extend horizontal to the middle of the vehicle (in this embodiment, there may not space for logo 1606 or it may be placed elsewhere). In one embodiment, some lighting components may be outside the compartments. In another embodiment, there may be two headlamp compartments on each side.

Also shown are VFAS lighting arrays 1302 and 1304 shown initially in FIG. 13 above. These light arrays or strips are in headlamp compartments 1602a and 1602b and may be shorter in length than the ones described above. In the embodiment shown in FIG. 16A, they are curved along the bottom of each compartment 1602a and 1602b. If there are rectangular-shaped compartments, then the light strip will be straight. The VFAS lights operate in the same basic manner, as noted, but in this embodiment they are not externally mounted to the vehicle or placed in an interior cabin or in a windshield pane.

FIG. 16B is another illustration of the front of a vehicle in accordance with one embodiment. Frontal view 1608 shows the same general items, namely, grille area 1610, logo 1612 and headlamp compartments 1614a and 1614b. The headlamp compartments are generally the same as those shown in FIG. 16A. In this embodiment, lighting arrays 1302 and 1304 are contained within the compartments but are mounted straight along the top border of each compartment. Again, the lights in each array 1302, 1304 operate in the same manner as described above.

In one embodiment, circuitry for VFAS includes a wire harness that is used to supply power to light strips 1302 and 1304. The VFAS circuitry may be part of or integrated with the circuitry for the headlamp compartment. In another embodiment, VFAS circuitry is outside of or external to headlamp circuitry. A VFAS wire harness may be used to connect to a power source, nearly always a battery, and lamps 1302a-x and 1304a-x (see FIG. 13) can be powered in this manner. Again, a circuitry module and harness for VFAS can be in headlamp compartments or placed somewhere externally.

Figure 17:
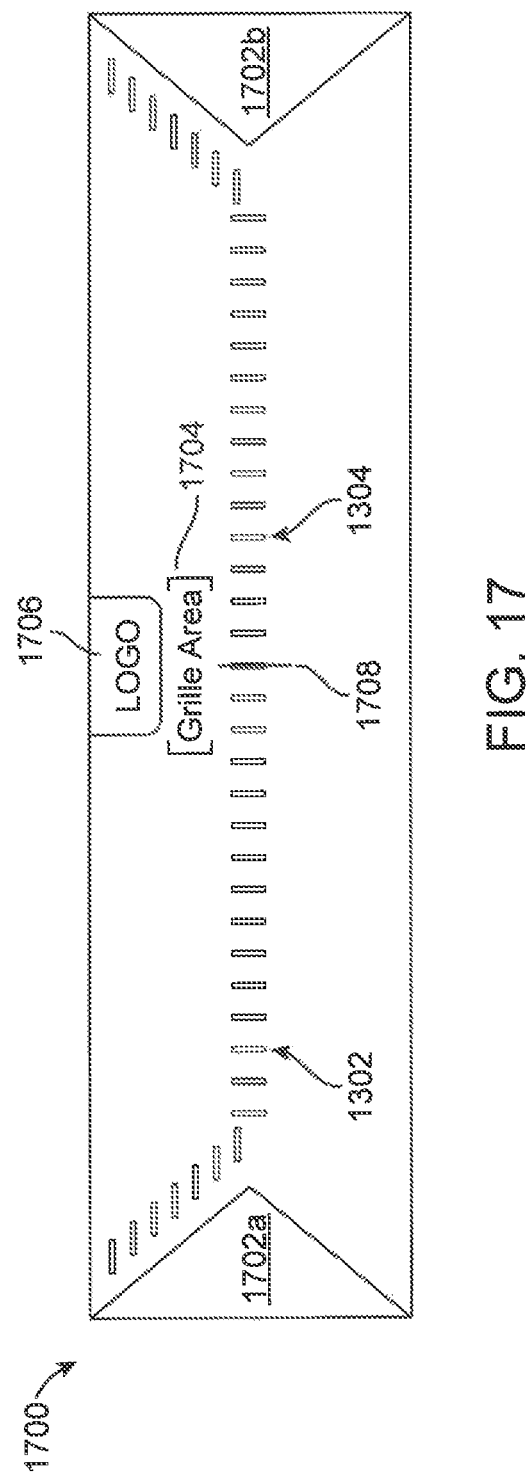
FIG. 17 is an illustration of a front view of a vehicle in accordance with one embodiment.

FIG. 17 is an illustration of a front view of a vehicle in accordance with one embodiment. Frontal view 1700 shows the shape and configuration of headlamp compartments 1702a and 1702b are different from conventional compartments as can be see in the figure. In this embodiment, the VFAS apparatus, including the light strips, circuitry, and other components are not contained wholly or in part in the headlamp compartments 1702a and 1702b. In this embodiment, light strips 1302 and 1304 are in a grille area 1704. This area contains light strips 1302 and 1304. Each one ends at or close to midpoint 1708. In other embodiments, the strips may not end at the mid-point and they may not begin as shown in the figure. In this embodiment, lamps 1302a-x and 1304a-x are shown as short vertical lines that illuminate. In other embodiments, the configuration and placement of the light strips in the front of a vehicle can vary depending on the design at the front of the vehicle.

In another embodiment, lights from VFAS may enable a defined projection of illumination on to the ground. However, in order to enable defined projection, the lights must be of a certain type and have specific characteristics that are known in the industry. In another embodiment, colors emitted are mentioned above, such as red, cyan, amber, and white but any suitable color may be used. Some of the colors may not be allowed in certain jurisdictions. Lamps 1302a-x and 1304a-x of the VFAS system of the present invention can be used with any color.

In one embodiment, the VFAS system can be provided by the OEM and can be factory installed in the headlamp compartments by the OEM.

As noted above, VFAS system contained in a headlamp compartment (FIGS. 16a and 16b) or in the grille area 1704 (FIG. 17) operate in the same manner as described in FIGS. 13 to 15. That is, light strips 1302 and 1304 indicate to a person or object via the lighting sequence and pattern of lamps 1302a-x and 1304a-x (e.g., LEDs) whether the car, other vehicle or other transportation means is slowing down, accelerating, remaining at a constant speed, or stopping.

Lamps 1302a-x and 1304a-x operate using the time variables m and n for time consistent lighting or m, n, and x, y for non-consistent time lighting sequencing and patterns. The primary difference is the length and positioning of the light strips. In some embodiments, the light strips extend longer horizontally, for example, from the left and right edges of the front of the vehicle to the center. In the embodiments in FIGS. 16a and 16b, the light strips are likely shorter since they are contained in headlamp compartments. How-ever, in one embodiment, these compartments may be larger and extend longer so that they approach or reach the center of the front of the vehicle. In these embodiments, the light strips will be horizontally longer.

With drivers being distracted with handheld devices and in-car interactive systems, the safety of pedestrians and other drivers improves in specific situations if they are confident that a car is slowing down or coming to a stop. Furthermore, with the advancement of autonomous and semi-autonomous driving technology in vehicles (including trucks and buses), people and other vehicles need visual and/or audio assurance that they are safe and the various embodiments implement this important safety component. Pedestrian responses to approaching vehicles and environmental factors are critical factors in avoiding pedestrian-vehicle crashes. The alert system described herein provides pedestrians with greater degrees of certainty about an approaching vehicle's actions and the driver's intent. Despite the thought processes pedestrians already employ in judging when it is safe to cross, pedestrian and vehicle crashes still occur at an alarming rate. The systems described herein can provide additional accretive measures that will aid in meaningfully reducing accidents involving pedestrians, cyclists, and other motor vehicles.

Although some embodiments have been described in detail, it should be appreciated that the present invention may be implemented in many other forms without departing from the spirit or scope of the invention. It should be appreciated that in some embodiments, one or more components in the apparatus or the steps in the methods may be modified, reordered and/or deleted. Therefore, the present embodiments should be considered illustrative and not restrictive and the invention is not to be limited to the details given herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of creating a lighting pattern on a light strip having a plurality of light elements, the method comprising:

determining a first speed of a vehicle;

if the first speed is over a threshold speed, the plurality of lights on the light strip illuminates a solid first color;

if the first speed is under the threshold speed, a first light element in the strip is powered for one of m plus x seconds or m seconds minus x seconds and a second light element in the strip is powered for one of m plus x seconds or m minus x seconds after one of n plus y seconds or n minus y seconds of the first light element being powered off, the plurality of light elements emanating a second color when the vehicle is decelerating when under the threshold speed;

wherein a first value of m plus x seconds and a second value of n plus y seconds increase as the vehicle decelerates, thereby creating a first fluctuating light pattern of the second color illuminating from the light strip;

wherein the first value of m minus x seconds and the second value of n minus y seconds decrease as the vehicle accelerates, thereby creating a second fluctuating light pattern of the first color illuminating from the light strip, wherein the value of x is variable and the value of y is variable and are not dependent on the first value of m or the second value of m or the first value of n and the second value of n; and wherein the first fluctuating light pattern of the second color is a visual indication that the vehicle is decelerating and the second fluctuating light pattern of the first color is a visual indication that the vehicle is accelerating.

* * * * *